US009652246B1

(12) United States Patent
Tam et al.

(10) Patent No.: US 9,652,246 B1
(45) Date of Patent: May 16, 2017

(54) BANKED PHYSICAL REGISTER DATA FLOW ARCHITECTURE IN OUT-OF-ORDER PROCESSORS

(71) Applicant: MARVELL INTERNATIONAL LTD., Hamilton (BM)

(72) Inventors: Kit Sang Tam, Menlo Park, CA (US); Winston Lee, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 549 days.

(21) Appl. No.: 14/137,519

(22) Filed: Dec. 20, 2013

Related U.S. Application Data

(60) Provisional application No. 61/740,336, filed on Dec. 20, 2012.

(51) Int. Cl.
| | | |
|---|---|---|
| G06F 15/00 | (2006.01) | |
| G06F 9/30 | (2006.01) | |
| G06F 9/40 | (2006.01) | |
| G06F 9/38 | (2006.01) | |

(52) U.S. Cl.
CPC .......... *G06F 9/3861* (2013.01); *G06F 9/3012* (2013.01); *G06F 9/3855* (2013.01)

(58) Field of Classification Search
None
See application file for complete search history.

(56) References Cited

U.S. PATENT DOCUMENTS

| | | | | | |
|---|---|---|---|---|---|
| 5,872,950 | A | * | 2/1999 | Levitan | ................. G06F 9/3836 |
| | | | | | 712/217 |
| 5,903,918 | A | * | 5/1999 | Bauman | ................ G06F 9/3836 |
| | | | | | 711/200 |
| 5,978,898 | A | * | 11/1999 | Hathaway | ............. G06F 9/3013 |
| | | | | | 712/208 |
| 6,167,497 | A | * | 12/2000 | Nakatsuka | .......... G06F 9/30138 |
| | | | | | 711/202 |
| 2005/0273579 | A1 | * | 12/2005 | Elmer | ................... G06F 9/3855 |
| | | | | | 712/218 |
| 2008/0082792 | A1 | * | 4/2008 | Vincent | ................ G06F 9/3836 |
| | | | | | 712/217 |
| 2010/0332804 | A1 | * | 12/2010 | Golla | .................... G06F 9/3838 |
| | | | | | 712/214 |

OTHER PUBLICATIONS

"Dynamic Scheduling—Tomasulo's Algorithm," available at http://www.cs.umd.edu/class/fall2001/cmsc411/projects/dynamic/tomasulo.html, Fall 2001 (2 pages).

Tomasulo, R.M., "An Efficient Algorithm for Exploiting Multiple Arithmetic Units," IBM J. of Research and Dev., vol. 11, No. 1, pp. 25-33 (Jan. 1967).

\* cited by examiner

*Primary Examiner* — George Giroux

(57) ABSTRACT

In a method of executing instructions in a processing system, respective global age tags are assigned to each of the one or more instructions fetched for processing by the processing system. Each global age tag indicates an age of the corresponding instruction in the processing system. Respective physical registers in a physical register file are allocated to each destination logical register referenced by each instruction. The respective global age tags are written to the in respective physical registers allocated to the destination logical registers of the instructions. The instructions are executed by the processing system. At least some of the instructions are executed in an order different from a program order of the instructions.

20 Claims, 7 Drawing Sheets

BANKED PHYSICAL REGISTER DATA FLOW ARCHITECTURE IN OUT-OF-ORDER PROCESSORS

CROSS-REFERENCE TO RELATED APPLICATION

This disclosure claims the benefit of U.S. Provisional Patent Application No. 61/740,336, entitled "BPRDF Architecture," filed on Dec. 20, 2012, which is hereby incorporated by reference herein in its entirety.

FIELD OF THE DISCLOSURE

The present disclosure relates generally to processor architectures, and more particularly to out-of-order processor architectures.

BACKGROUND

Single threaded processing systems are commonly employed by processing units, such as central processing units (CPU) and other general purpose and/or specialized microprocessor systems. To increase single thread performance of such processing units, clock frequency at which the processing units operate can be increased. In addition to, or instead of, increasing the clock frequency, instruction issue width employed by the processing units can be increased, allowing the processing units to execute more instructions in a single clock cycle. However, increasing the clock frequency and/or increasing the issue width of a processing unit typically results in a significant increase of the size of the processing unit and a significant increase of power dissipation of the processing unit.

SUMMARY

In an embodiment, a method of executing instructions in a processing system includes fetching one or more instruction to be executed by the processing system. The method also includes assigning respective global age tags to each of the one or more instructions, wherein each global age tags indicates an age of the corresponding instruction in the processing system. The method further includes allocating, to each destination logical register referenced by each instruction, respective physical registers in a physical register file. The method additionally includes writing the respective global age tags assigned to the instructions in respective physical registers allocated to the destination logical registers of the instructions. The method additionally includes executing at least some of the instructions in an order different from a program order of the instructions.

In another embodiment, a processing system comprises a plurality of reservations stations, each reservation station coupled to one or more functional units configured to execute instructions. The processing system also comprises one or more decoders configured to simultaneously decode one or more instructions, fetched from a memory, the one or more instructions corresponding to instructions of a program code. The processing system additionally comprises a mapping unit configured to assign respective global age tags to each of the one or more instructions, wherein each global age tags indicates an age of the corresponding instruction in the processing system. The mapping unit is further configured to allocate, to each destination logical register referenced by each instruction, respective physical registers in a physical register file, and to write the respective global age tags assigned to the instructions in respective physical registers allocated to the destination logical registers of the instructions. The reservation stations are configured to to send at least some of the instructions to the functional units coupled to the reservation stations in an order different from a program order of the instructions.

DETAILED DESCRIPTION

Figure 1:
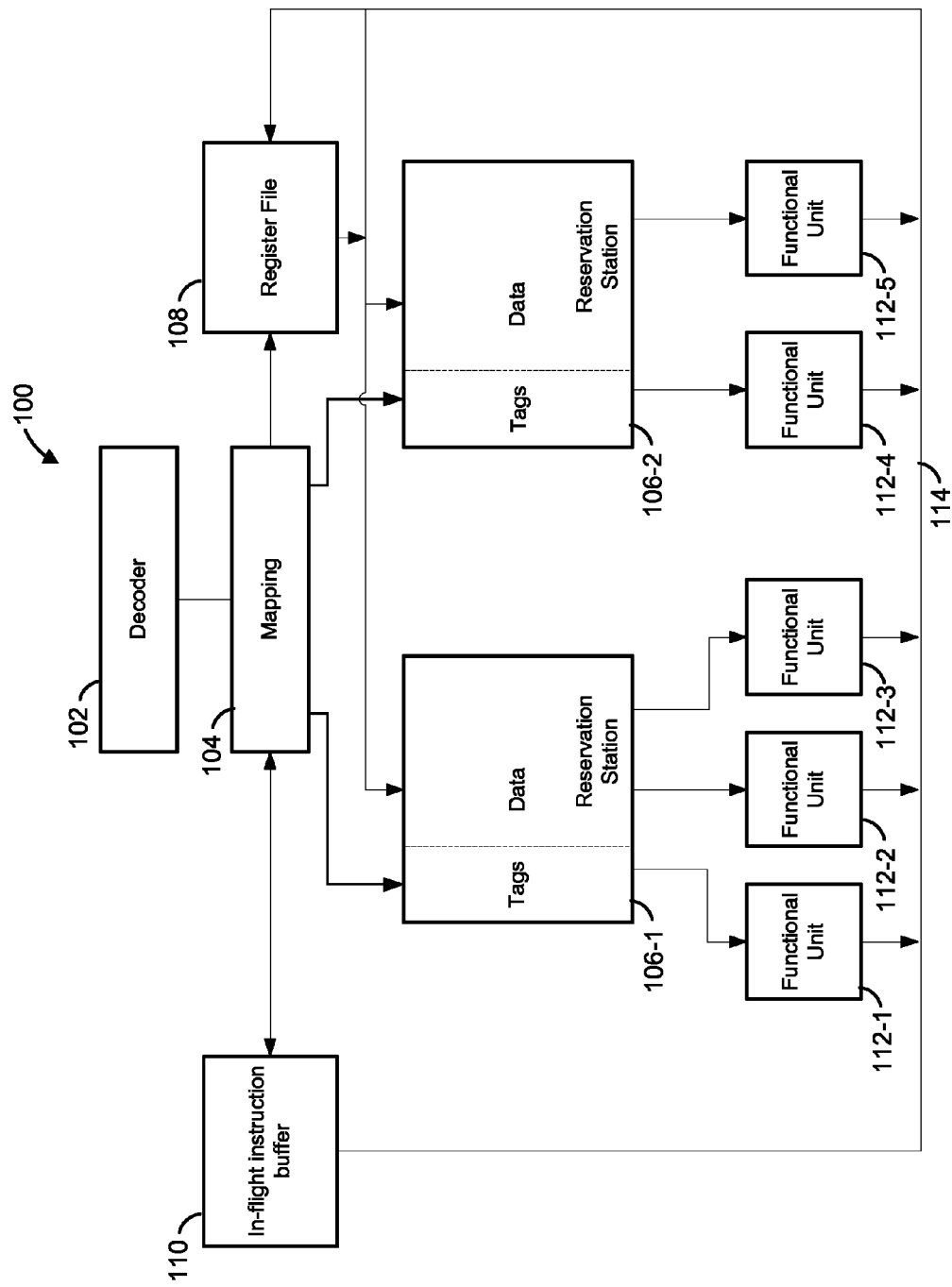
FIG. 1 is a block diagram of an example processing system, according to an embodiment of the present disclosure.

FIG. 1 is a block diagram of an example processing system 100, according to an embodiment of the present disclosure. In an embodiment, the processing system 100 is part of an out of order (OOO) processor configured to execute at least some instructions in an order different from the program order of the instructions. The processing system 100 operates according to the known Tomasulo's algorithm for out of order execution of instructions, in an embodiment. The processing system 100 operates in other suitable manners to execute out of order instructions, in other embodiments. The out of order execution of instructions generally reduces or eliminates stall times encountered by the processing system 100, in at least some embodiments. According to an embodiment, when the processing system 100 stalls on a first instruction, for example when data needed for execution of the first instruction (e.g., one or more operands of the first instruction) are not yet produced by a pervious instruction, the processing system 100 looks ahead in a set of instructions, selects an instruction for which all necessary data is available, and executes the selected instruction. Then, when the necessary data becomes available for the first instruction, the processing system 100 executes the first instruction. In an embodiment, although at least some instructions in a set of instructions are executed in an order different form the program order of the instructions, the processing system 100 is configured to retire the instructions from the processing system 100, and to reclaim resources that were used for executing the instructions by the processing system 100, according to the program order of the instructions. In various embodiments described below, to efficiently keep track of program order of the instructions currently being executed (and/or queued for subsequent execution) by the processing system 100 ("in-flight instructions"), the processing system 100 assigns global age tags to the instructions, wherein the global age tags indicate the program order of the instructions (i.e., the order in which the instructions appear in the program being executed), and utilizes the global age tags for performing various operations with respect to the instructions, such as maintaining program order of the instructions when retiring the instructions, data forwarding for execution of instructions, write-back of results of execution of the instructions, scheduling execution of the instructions, etc.

In some embodiments, the processing system 100 is configured to execute multiple instructions simultaneously (e.g., during a single clock cycle). Executing multiple instructions during a single clock cycle generally increases performance of the processing system 100, for example by increasing the number of millions of instructions per second (MIPS) executed by the processing system 100 and/or increasing the number of program iterations per second ("Dhrystone number") executed by the processing system 100. As will be explained in more detail below, the various architectures of the present disclosure allow the processing system 100 to increase the number of instructions executed per clock cycle by the processing system 100, i.e. to increase "issue width" of the processing system 100, without significantly increasing area occupied by the processing system 100 and without significantly increasing power dissipation of the processing system 100, in at least some embodiments. Also, the various architectures of the present disclosure allow the processing system 100 to increase the issue width of the processing system 100 without significantly impacting logic complexity of various elements of the processing system 100, in at least some embodiments.

The processing system 100 includes a decoder unit 102 coupled to a mapping unit 104. The mapping unit 104 is coupled to a plurality of reservation stations 106, a physical register file 108 and an in-flight instruction buffer 110. Each of the reservation stations 106 is coupled to one or multiple functional units 112. The functional units 112 are configured to execute various instructions, in an embodiment. For example, the functional units 112-1 through 112-3 are arithmetic and logic units (ALU), such as adders or multipliers, the functional unit 112-4 is a load unit, the functional unit 112-3 is a load and store unit, etc. A common bus 114 connects respective outputs of the functional units 112 to the physical register file 108 for writing the operation results of the instructions back to the physical register file 108. The common bus 114 also couples the respective outputs of the functional units 112 to the reservation stations 106 for forwarding of the results of the instructions to the reservation stations 106 that may need the results for executing subsequent instructions queued by the reservation stations 106 ("data forwarding"), and to the in-flight instruction buffer 110 for providing status updates (e.g., for completed instructions) to the in-flight instruction buffer 110, in an embodiment.

Although two reservation stations 106 are illustrated in FIG. 1, the processing system 100 includes other suitable numbers (e.g., 1, 3, 4, 5, 6, etc.) of reservation stations 106, in other embodiments. Similarly, although five functional units 112 are illustrated in FIG. 1, the processing system 100 includes other suitable numbers of functional units 112, in other embodiments. Further, in various embodiments, each of the reservation stations 106 is coupled to any suitable number of functional units 112. For example, each of the reservation stations 106 is coupled to respective two function units 112, in an embodiment. As just another example, the reservation stations 106-1 is coupled to only one functional unit 112, while the reservation station 106-2 is coupled to multiple (e.g., 2, 3, 4, 5, 6, etc.) functions units 112, in another example embodiment.

Generally speaking, the physical register file 108 comprises a plurality of physical registers used for temporary storage of values of various registers referenced by instructions being executed by the processing system 100. In an embodiment, the number of physical registers contained in the physical register file 108 exceeds the number of logical, or architectural, registers defined by an instruction set architecture (ISA) being implemented by the processing system 100. In an embodiment, the mapping unit 104 is configured to map architectural registers referenced by the instructions being processed to the physical registers in the physical register file 108. Suitably mapping the logical registers referenced by the instructions to the physical registers in the physical register file 108 decouples the instructions and removes unnecessary dependencies between the instructions to allow out of order execution of such instructions, in an embodiment.

As will be described in more detail below, in some embodiments, the physical register file 108 is organized as a plurality of register banks. For example, in one such embodiment, the physical register file 108 includes a respective physical register bank corresponding to each architectural register defined by the instruction set architecture (ISA) supported by the processing system 100. As just an example, the processing system 100 supports a 16-register ISA, such as a 16-register ARM ISA, and the physical register file 108 includes 16 register banks, with each register bank corresponding to a respective one of the architectural registers defined by the ISA, in an embodiment. The mapping unit 104 is configured to map a logical register to a physical register in the register bank corresponding to the logical register in the physical register file 108, in an embodiment.

In operation, an instruction fetched by the processing system 100 is provided to the decoder unit 102. The decoder unit 102 decodes the instruction and provides the decoded instruction to the mapping unit 104. The mapping unit 104 assigns a global age tag to the instruction. The global age tag represents an age of the instruction in the processing system 100 and, accordingly, represents an order of the instruction in the program code being executed by the processing unit 100, in an embodiment. In an embodiment, the global age tag comprises ten bits. In another embodiment, the global age tag comprises another suitable number of bits (e.g., 1, 2, 3, 4, 5, 6, 7, 8, 9, 11, 12, 13, etc. bits).

The mapping unit 104 applies register renaming to the instruction to appropriately map architectural registers referenced by the instruction to the physical registers contained in the physical register file 108, in an embodiment. Generally speaking, the instruction references registers corresponding to each of one or more operands of the instruction, and a destination register corresponding to the result of the instruction. The mapping unit 104 is configured to re-name at least the destination register of the instruction to a particular physical register in the physical register file 108 to avoid certain data hazards, such as write-after-read (WAR) data hazards that may result in at least some situations in which instructions that reference a same logical destination register are executed out of order, in an embodiment. Further, if the instruction includes an operand register corresponding to a previously re-named destination register of a previous instruction, the mapping unit 104 re-names this operand register with the new name of the destination register of the previous instruction to allow correct operand data to be subsequently obtained for the instruction, in an embodiment.

The mapping unit 104 writes the global age tag assigned to the instruction to the mapped register, in the physical register file 108, corresponding to the destination register of the instruction, and issues the instruction to an appropriate reservation station 106 for subsequent execution of the instruction. In an embodiment, when the mapping unit 104 issues the instruction, the mapping unit 104 also provides the global age tag assigned to the instruction to the appropriate reservation station 106. Further, the mapping unit 104 provides the instruction and the global age tag assigned to the instruction to the in-flight buffer 110.

The reservation station 106 receives the instruction, along with the global age tag assigned to the instruction, from the mapping unit 104, and accesses the register file 108 to obtain contents of the physical registers corresponding to the one or more operands of the instruction. The physical registers contain either the value of the operand of the instruction, or, if a value of an operand of the instruction is not yet available, the corresponding physical register contains a global age tag of the instruction that will subsequently produce the operand value. The reservation station 106 suitably associates the instruction, the global age tag of the instruction, and the register contents obtained for the instruction from the register file 108, for example by storing such associations in a table or a database that queues the instructions issued to the reservation station 106. If not all of the operands of the instruction are available at issue of the instruction, the reservation station 106 listens on the common bus 114 for the global age tag (or tags) obtained for each of one or more operands of the instruction from the register file 108, in an embodiment. Once a value for an operand becomes available on the common bus 114, the reservation station 106 obtains the value from the common bus 114 and associates the value with the instruction (e.g., replaces the global age tag obtained for the operand from the register file 108 with the value for the operand obtained from the common bus 114). The common bus 114 also provides the value to the register file 108, and the global age tag corresponding to the instruction that produced the value is overwritten with the actual value produced by the instruction, in an embodiment.

Once all of the operands of the instructions are available to the reservation station 106, the reservation station 106 schedules the instruction for execution by an appropriate functional unit 112 coupled to the reservation station 106. In an embodiment, the reservation station 106 provides the one or more operands of the instructions and the re-named destination register of the instruction to the appropriate functional unit 112 that will execute the instruction. The functional unit 112 executes the instruction and writes the result of the instruction to the re-named destination register in the physical register file 108. The functional unit 112 also provides the result of the instruction to the common bus 114 to make the result of the instruction available to a reservation station 106 that may be waiting for the result of the instruction (e.g., a reservation station is listening on the common bus 114 for a global age tag associated with the present instruction) for executing a subsequent instruction, in an embodiment. Additionally, the result of the instruction and the global age tag associated with the instruction is provided via the common bus 114 to the in-flight instruction buffer 110 to indicate to the instruction buffer 110 that the instruction is completed, in an embodiment.

The in-flight instruction buffer 110 ensures that in-flight instructions are retired from the processing system 100 in the order in which the instructions appear in the program being executed, in an embodiment. The in-flight instruction buffer 110 generally keeps track of states of current in-flight instructions in the processing system 100, and retires an instruction, or a set of instructions, when all previous instructions have been completed by the processing system 100. Because the instruction buffer 110 buffers the respective global age tags associated with the instructions, the instruction buffer 110 is capable of efficiently retiring a completed instruction, or a set of completed instructions having consecutive global age tags, by detecting that no in-flight instructions having earlier global age tags are present in the processing system 100, in an embodiment.

When instructions are retired from the processing system 100, resources used for execution of the instructions (e.g., physical registers associated with the instructions) are de-allocated and are made available for execution of subsequent instructions, in an embodiment. In an embodiment, the in-flight instruction buffer 110 notifies the mapping unit 104 of a retired instruction or a set of retired instructions. In an embodiment, the mapping unit 104 is capable of simultaneously de-allocating resources (e.g., the physical registers) previously allocated to each instruction in the set of retired instructions by using the global age tags associated with the instructions, as will be explained in more detail below. The global age tags associated with the retired instructions become available to be subsequently reused by other instructions, in an embodiment.

Figure 2:
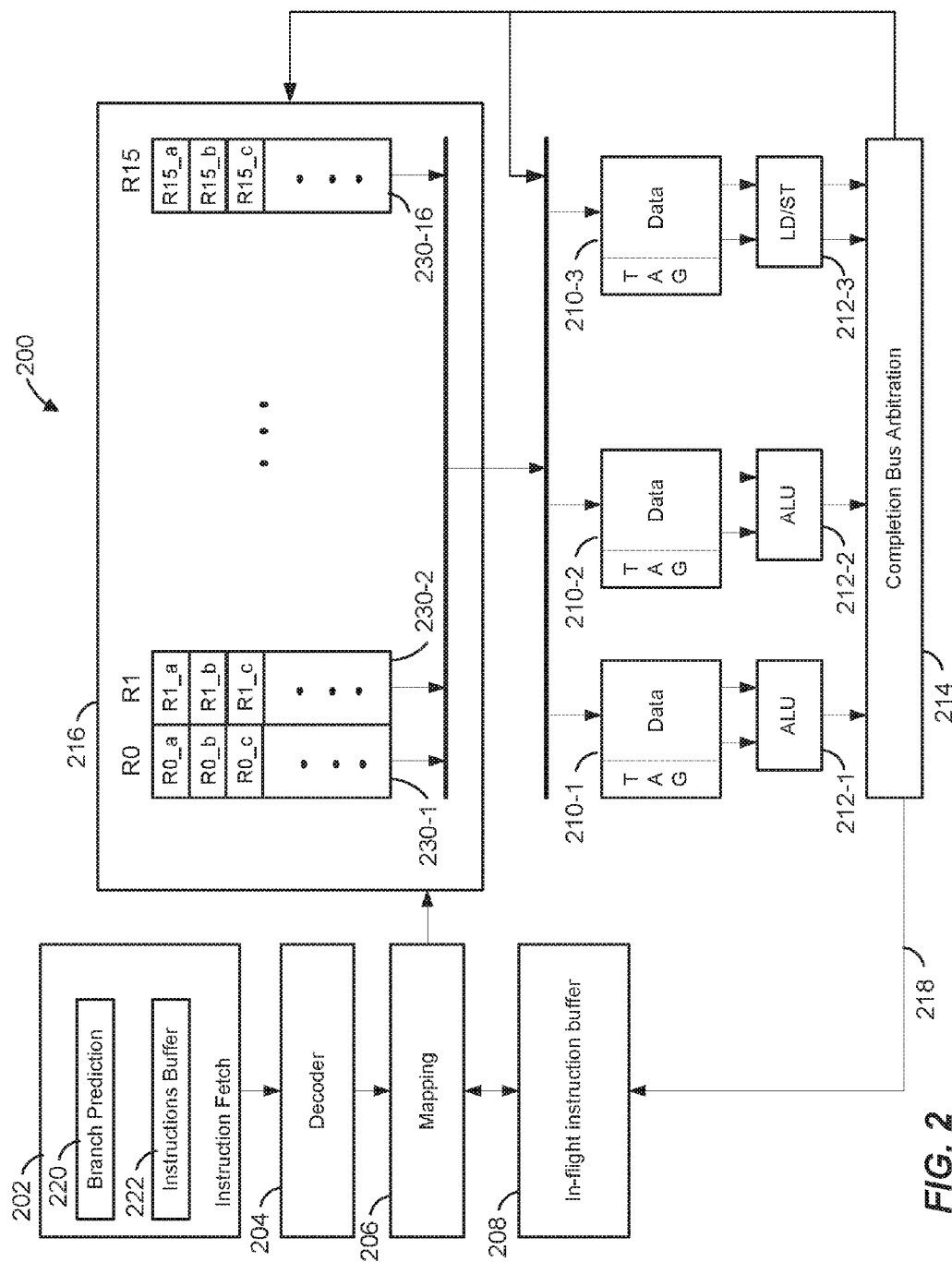
FIG. 2 is block diagram illustrating a processing system, according to another embodiment.

FIG. 2 is a block diagram illustrating a processing system 200, according to another embodiment. The processing system 200 is generally similar to the processing system 100 of FIG. 1. The processing system 200 includes an instruction fetch unit 202 coupled to a decoder unit 204. The decoder unit 204 is coupled to a mapping unit 206. The mapping unit 206 is, in turn, coupled to an in-flight instruction buffer 208, a plurality of reservation stations 210, and a physical register file 216. The reservation stations 210 are coupled to functional units 212 and are configured to cause execution of the instructions by the function unit 212. The respective outputs of the functional units 212 are coupled, via a completion bus arbitration unit 214, to a common bus 218.

With continued reference to FIG. 2, in an embodiment, the instruction fetch unit 202 includes a branch predication unit 220 and an instruction buffer 222. Generally speaking, the instruction fetch unit 202 retrieves instructions from a memory (not shown) and stores the fetched instructions in the instructions buffer 222. In an embodiment, when the program being executed encounters a conditional statement, such as an if-then statement, the branch prediction unit 222 of the instruction fetch unit 202 predicts which branch the program will take, before the statement is actually executed by the processing system 200, and the instruction fetch unit 202 continues fetching the instructions by fetching retrieving the instructions corresponding to the predicated branch. The instruction buffer 220 queues the fetched instruction according to the program order of the instructions, in an embodiment. The instruction fetch unit 202 provides the instructions queued in the instruction buffer 220, in the program order of the instructions, to the decoder unit 204. Depending on the issue width of the processing system 200, one or several instructions are provided to the decoder unit 204 in a single clock cycle, in various embodiments.

The decoder unit 204 decodes the instructions and provides the decoded instructions to the mapping unit 206. According to an embodiment, the mapping unit 206 operates as described above with respect to the mapping unit 104 of FIG. 1 to map logical registers referenced by the instructions to physical registers of the physical register file 216. In the embodiment of FIG. 2, the physical register file 216 is partitioned into a plurality of register banks 230. In an embodiment, the number of physical register banks 230 corresponds to the number of logical registers supported by the ISA supported by the processing system 200. In the embodiment of FIG. 2, the processing system 200 supports a 16-logical register ISA, and the physical register file 216 includes 16 register banks 230. In an embodiment, each of the register banks 230 is a dual port memory having one read port and one write port ("1R1 W port memory"). In this embodiment, each of the register banks 230 includes a respective single read port and a respective single write port. In an embodiment, each of the register banks 230 is configured as a respective queue of registers, such as an ordered circular queue of registers. In an embodiment, a queue of registers of a register bank 230 is configured to queue values of a particular logical register produced by execution of the in-flight instructions that reference the particular logical register.

In an embodiment, the decoder unit 206 provides the decoded instructions to the mapping unit 206 according to the program order of the instructions. The mapping unit 206 processes the decoded instructions in the program order of the instructions, in this embodiment. The mapping unit 206 assigns, to each instruction, a global age tag that indicates the age of the instruction in the system 200 and, accordingly, indicates the program order of the instruction. The mapping unit 206 also re-names at least the destination logical registers of the instructions to allocate physical registers in the physical register file 214 to the destination logical registers of the instructions. Generally speaking, the mapping unit 206 is configured to map logical registers referenced by the instructions to physical registers in the physical register file 214. In an embodiment, the mapping unit 206 is configured to map logical destination register referenced by the instructions to respective register banks 230 corresponding to the destination logical registers. Thus, for example, every time the mapping unit 206 encounters a logical destination register R0, the mapping unit 206 maps the logical destination register R0 to an available physical register in the register bank 230-1, which corresponds to the logical register R0. Similarly, every time the mapping unit 206 encounters a logical destination register R1, the mapping unit 206 maps the logical destination register R1 to an available physical register in the register bank 230-2, which corresponds to the logical register R1, and so on, in an embodiment. A specific example register renaming scheme employed by the mapping unit 206, according to an example embodiment, is described below with respect to FIG. 3.

In an embodiment in which the register banks 230 are configured as respective register queues, the mapping unit 206 maintains indications, such as pointers, to respective heads and tails of each of the queues. In an embodiment, the mapping unit 206 maps a logical register to a corresponding register bank in the physical register file 216 by mapping the logical register to a register immediately following the tail of the queue. For example, to map a logical register to a physical register in a register bank 230, the mapping unit 206 increments the corresponding indication (e.g., pointer) of the current tail of the corresponding queue to the next register location in the queue, and allocates the next register location to the logical register being mapped by the mapping unit 206.

In an embodiment, the mapping unit 206 writes the global age tags assigned to the instructions to the allocated destination registers of the instructions. The mapping unit 206 then issues the instructions, in the program order of the instructions, to appropriate reservations stations 210. In an embodiment, the reservation stations 210 operate in a manner the same as or similar to the reservation stations 106 of FIG. 1 to dispatch the instructions to the functional units 212. For example, a reservation station 210 schedules an instruction to be dispatched to a functional unit 212 when values of all operands of the instruction are obtained by the reservation station 210. In an embodiment, the reservation station 210 utilizes the global age tags associated with the instructions to efficiently schedule the instructions for execution of the instructions by the functional units 212. For example, the reservation station 210 selects an instruction to be executed next from a set of instructions ready to be executed by selecting the instruction, form the set of instructions, having the oldest global age tag, in an embodiment.

After the instructions are executed by the functional units 212, the results of the instructions are provided to the common bus 218 via the completion bus arbitration unit 214. The common bus 218 provides the results to the register file 216 so that the results can be written to the appropriate physical registers in the physical register file 216. In some embodiments, respective values to be written to multiple ones of the register banks 230 are simultaneously provided by the common bus 218 to the register file 216. The respective values to be written to the multiple ones of the register banks 230 are then written in parallel to the respective register banks 230. In an embodiment, the completion bus arbitration unit 214 ensures that at most one value to be written to a particular register bank 230 is provided to the common bus 218 in a same clock cycle. In this respect, the arbitration unit 214 pipelines the values to be written to a same register bank 214 when multiple instructions that reference destination registers in the same register bank 230 are simultaneously dispatched to respective functional units 212 and are simultaneously executed by the respective functional units 212.

Figure 3:
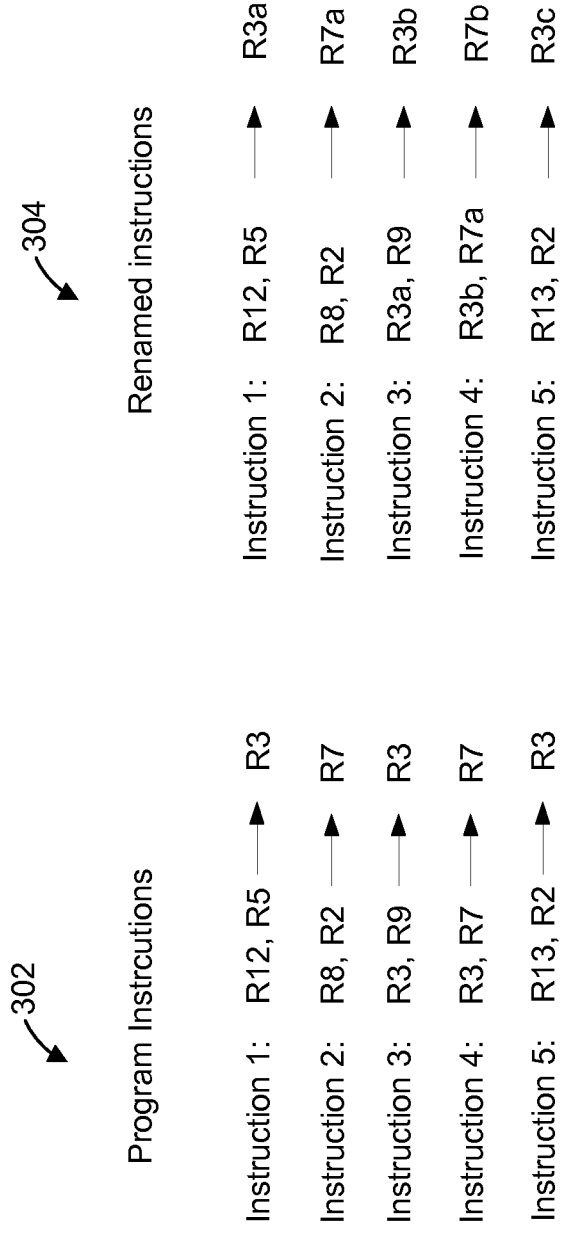
FIG. 3 illustrates an example register renaming scheme, according to an embodiment.

With continued reference to FIG. 2, the common bus 218 also provides the completed instructions, along with the global age tags corresponding to the completed instructions, to the in-flight instruction buffer 208. In an embodiment, the in-flight instruction buffer 208 is the same as or similar to the in-flight instruction buffer 110 of FIG. 1. In an embodiment, the in-flight instruction buffer 208 operates in a manner the same as or similar to the in-flight instruction buffer 110 of FIG. 1 to retire completed instructions in the program order of the instructions. The in-flight instructions buffer 208 provides updates to the mapping unit 206 indicating global age tags of the retired instructions to the mapping unit 206. In response to receiving the updates, the mapping unit 206 de-allocates the physical registers previously allocated to the retired instructions. For example, the mapping unit 206 receives a global age tag corresponding to the youngest instruction in a set of instructions being retired, in an embodiment. The mapping unit 206 then de-allocates physical registers corresponding to all instructions having respective global age tags with values less than the received global age tag corresponding to the youngest instruction, in an embodiment. In an embodiment, the mapping unit 206 simultaneously (e.g., in a single clock cycle) de-allocates multiple physical registers, corresponding to the instructions being retired, in one or more of the register banks 230. In an embodiment, to simultaneously (e.g., in a single clock cycle) de-allocate a set of physical registers in a particular physical register bank 230, the mapping unit 206 moves an indication of (e.g., a pointer to) the register location of the current head of the queue, in the physical register bank 230, to a register location immediately following the register location corresponding to the youngest instruction of the set of instructions, as indicated by the respective global age tags associated with the instructions. In an embodiment, the mapping unit 206 simultaneously (e.g., in a single clock cycle)

de-allocates physical registers corresponding to a set of instructions being retired in multiple ones of the register banks 230 by moving respective indications of head locations to respective register locations immediately following the register location corresponding to the youngest instruction in each one of the multiple register banks 230. Turning now briefly to FIG. 3, an example register renaming scheme 300 is illustrated. In an embodiment, the register renaming scheme 300 is implements by the mapping unit 206 of FIG. 2, and the register scheme 300 will be described with reference to FIG. 2. In FIG. 3, a set of program instructions 302 corresponds to an example set of program instructions prior to being processed by the mapping unit 206, and a corresponding set of renamed instructions 304 corresponds to the set of instructions 302 after the instructions have been processed by the mapping unit 206. Each instruction in FIG. 3 is illustrated as having two source registers (separated by a comma) corresponding to operands of the instruction, and a destination register (following an arrow) corresponding to the result of the instruction. Letters indicated as subscripts in the set of renamed instructions 304 of FIG. 3, in alphabetical order, indicate consecutive register locations in the queues in the corresponding register banks 230.

Referring to FIGS. 2 and 3, the register banks 230 are initially empty. The mapping unit 206 first processes the program instruction 1, and renames the destination register R3 of the instruction 1 as the first register in the register bank 230 corresponding to the logical register R3, as indicated by the reference $R3_a$ in the instruction set 304 of FIG. 3. Similarly, the mapping unit 206 processes instruction 2 and renames the destination register R7 of the instruction 2 as the first register in the register bank 230 corresponding to the logical register R7, as indicated by the reference $R7_a$ in the instruction set 304 of FIG. 3. Then, the mapping unit 206 processing instruction 3. Instruction 3 includes, as a source register, an already mapped register R3. Accordingly, the mapping unit 206 renames the source register R3 as the register R3a. Further, the mapping unit 206 renames the destination register R3 as a next register in the queue of the register bank 230 corresponding to the logical register R3, as indicated by the reference $R3_b$ in the instruction set 304 of FIG. 3.

Then, the mapping unit 206 processes instruction 4 by renaming the source register R3 in the instruction 4 as the now renamed register $R3_b$, renaming the source register R7 in the instruction 4 as the now renamed register $R7_a$, and renaming the destination register R7 in the instruction 4 as the next register in the queue of registers of the register bank 203 corresponding to the logical register R7, as indicated by the reference $R7_b$ in the instruction set 304 of FIG. 3. Then, the mapping unit 206 processes the instruction 5 and renames the destination register R3 of the instruction 5 as the next register in the queue of registers of the register bank 230 corresponding to the logical register R3, as indicated by the reference $R3_c$ in the instruction set 304 of FIG. 3.

Referring again to FIG. 2, the processing system 200 is configured to flush a set of one or more instructions in a case of a branch misprediction by the branch prediction unit 220. For example, upon execution of a conditional statement, the processing system 200 determines that a wrong branch was predicted for the conditional statement by the branch prediction unit 220. Then, the processing system 200 flushes instructions corresponding to the wrong branch from the processing system 200, and reclaims the resources (e.g., physical registers) allocated to these instructions. In an embodiment, when a set of one or more instructions is flushed by the processing system 200, the global age tags associated with the instructions are provided to the mapping unit 206. In another embodiment, when a set of one or more instructions is flushed by the processing system 220, the global age tags associated with the oldest instruction being flushed is provided to the mapping unit 206. In an embodiment, the mapping unit 206 de-allocates physical registers corresponding to all instructions having respective global age tags with values greater than the received global age tag corresponding to the oldest instruction being flushed, in an embodiment. In an embodiment, the mapping unit 206 simultaneously (e.g., in a single clock cycle) de-allocates multiple physical registers, corresponding to the flushed instructions, in one or more of the register banks 230. In an embodiment, to simultaneously (e.g., in a single clock cycle) de-allocate a set of physical registers in a particular physical register bank 230, the mapping unit 206 moves an indication of (e.g., a pointer to) the register location of the current tail of the queue in the register bank 230 to a register location immediately preceding the register location corresponding to the oldest instruction of the set of instructions, as indicated by the respective global age tags associated with the instructions. In an embodiment, the mapping unit 206 simultaneously (e.g., in a single clock cycle) de-allocates physical registers corresponding to a set of instructions being flushed in multiple ones of the register banks 230 by moving respective indications of current tail locations to respective register locations immediately preceding the register location corresponding to the oldest instruction in the set of instructions being flushed in each one of the multiple register banks 230.

In an embodiment, the processing system 200 is configured to efficiently implement various load and store instructions to simultaneously load from a memory or to store in a memory, respectively, values of multiple in respective multiple ones of the register banks 230. For example, the processing system 200 implements a load multiple instruction defined by the ARM ISA that specifies a set of multiple registers to be loaded with data from consecutive locations in the memory the data in parallel to respective physical banks 230 corresponding to the logical registers. Similarly, the processing system 200 implements a store multiple instruction defined by the ARM ISA that specifies a set of multiple registers values of which are to be stored in consecutive locations in a memory by reading data in parallel from respective physical banks 230 corresponding to the specified logical registers.

Figure 4:
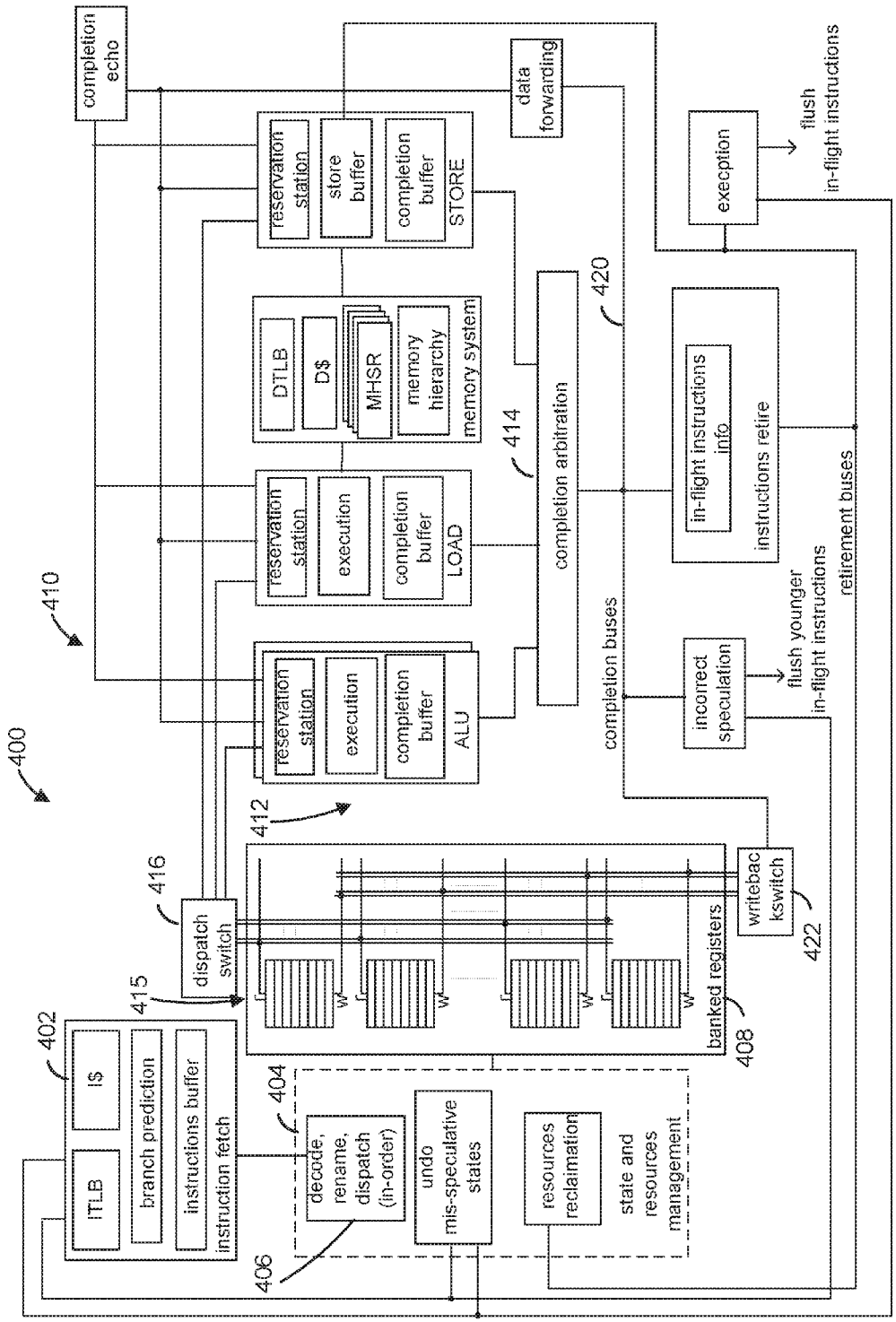
FIG. 4 illustrates an example implementation of the processing system of FIG. 2, according to an embodiment.

FIG. 4 illustrates an example implementation 400 of the processing system 200 of FIG. 2, according to an embodiment. The implementation 400 includes an instruction fetch unit 402 coupled to a state and management unit 404 having a decode, rename and dispatch unit 406, a banked register file 408, a plurality of reservation stations 410 coupled to respective execution (or functional) units 412, and a completion arbitration unit 414, and a common bus 420. With reference to FIG. 2, the instruction fetch unit 402 corresponds to the instruction fetch unit 202, and the decode, rename and dispatch unit 406 corresponds collectively to the decode unit 204 and the mapping unit 206, in an embodiment. The decode, rename and dispatch unit 406 processes instructions provided to the decode, rename and dispatch unit 406 by the instruction fetch unit 402. In an embodiment, the decode, rename and dispatch unit 406 assigns global age tags to the instructions, performs register renaming with respect to the instructions, dispatches instructions to appropriate reservation stations, etc., as described above with respect to the decode unit 204 and the mapping unit 206 of FIG. 2.

In an embodiment, the banked register file 408 corresponds to the banked register file 216 of FIG. 2. The banked register file 408 comprises a plurality of register banks 415, with each register bank 415 having a single read port (marked r in FIG. 4) and a single write port (marked w in FIG. 4). The banked register file 408 is coupled to the state and management unit 404 and to the plurality of reservation stations 412. A dispatch switch 416 is coupled to the read ports of the register banks 415 and is configured to simultaneously provide data from appropriate multiple ones of the register banks 415 to the reservation stations 414. The reservation stations 410 provide data read from the register file 408 (or obtained from the common completion bus 420) to the execution units 412, which execute the instructions and provide the results, via the completion arbitration unit 414, to the common bus 420 and to the register file 408. A write back switch 422 is coupled to the write ports of the respective register banks 415 an is configured to provide the results to appropriate ones of the register banks 415. In an embodiment in which multiple instructions are simultaneously executed by multiple ones of the execution units 412 (e.g., in a multiple-issue system, such as a 2-issue system or a 4-issue system), the write back switch 422 provides multiple results simultaneously produced by multiple execution units 412, in parallel in a single clock cycle, to respective ones of the register banks 415.

Figure 5:
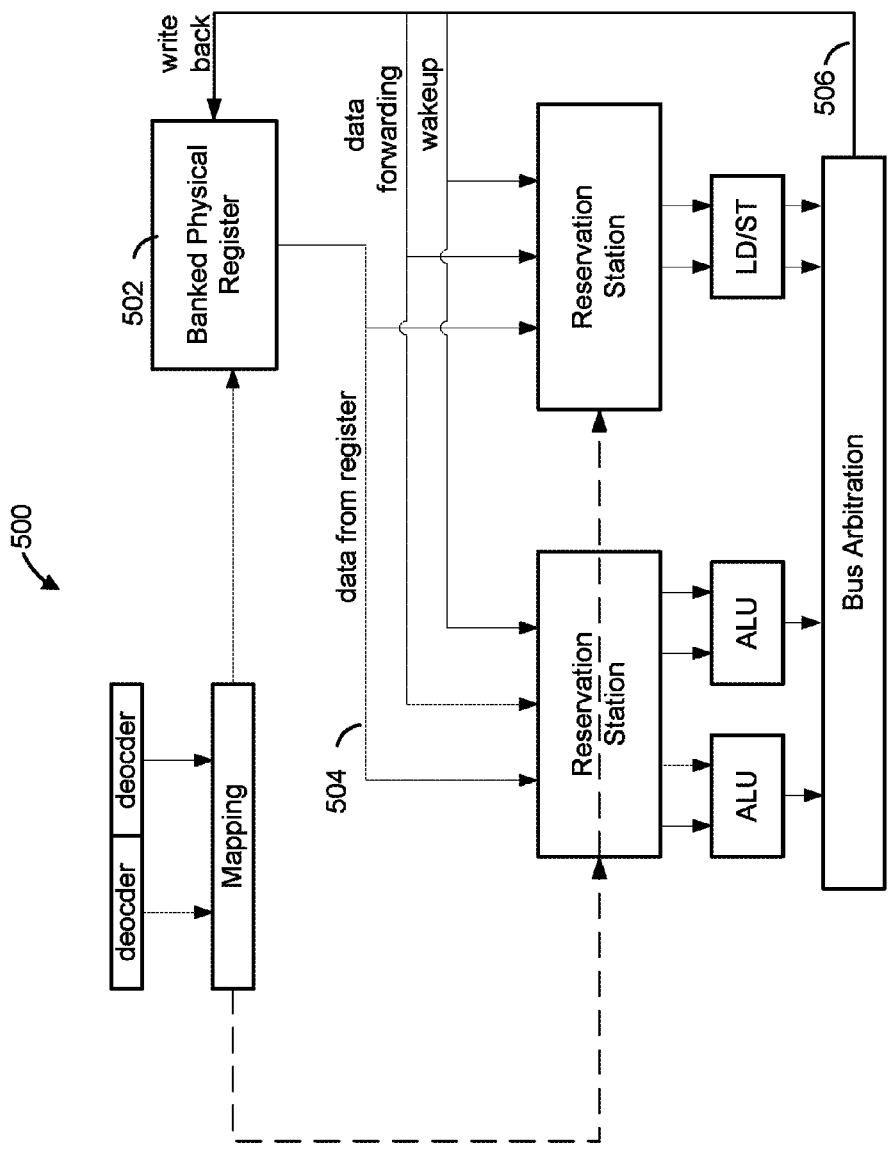
FIG. 5 is a block diagram of a processing system configured to simultaneously execute two instructions, according to an embodiment.

FIG. 5 is a block diagram of a processing system 500 configured to simultaneously execute two instructions, according to an embodiment. The processing system is generally the same as the processing system 200 of FIG. 2, in an embodiment. The processing system 500 includes a banked register file 502. Data corresponding to two instructions simultaneously issued in the system 500 is read in parallel from respective register banks in the banked register file 502 via a data bus 504, in at least some embodiments and scenarios. Similarly, data resulting from simultaneous execution two instructions in the processing system 500 is written in parallel to respective register banks of the register file 502 via a results bus 506, in at least some embodiments and scenarios.

Figure 6:
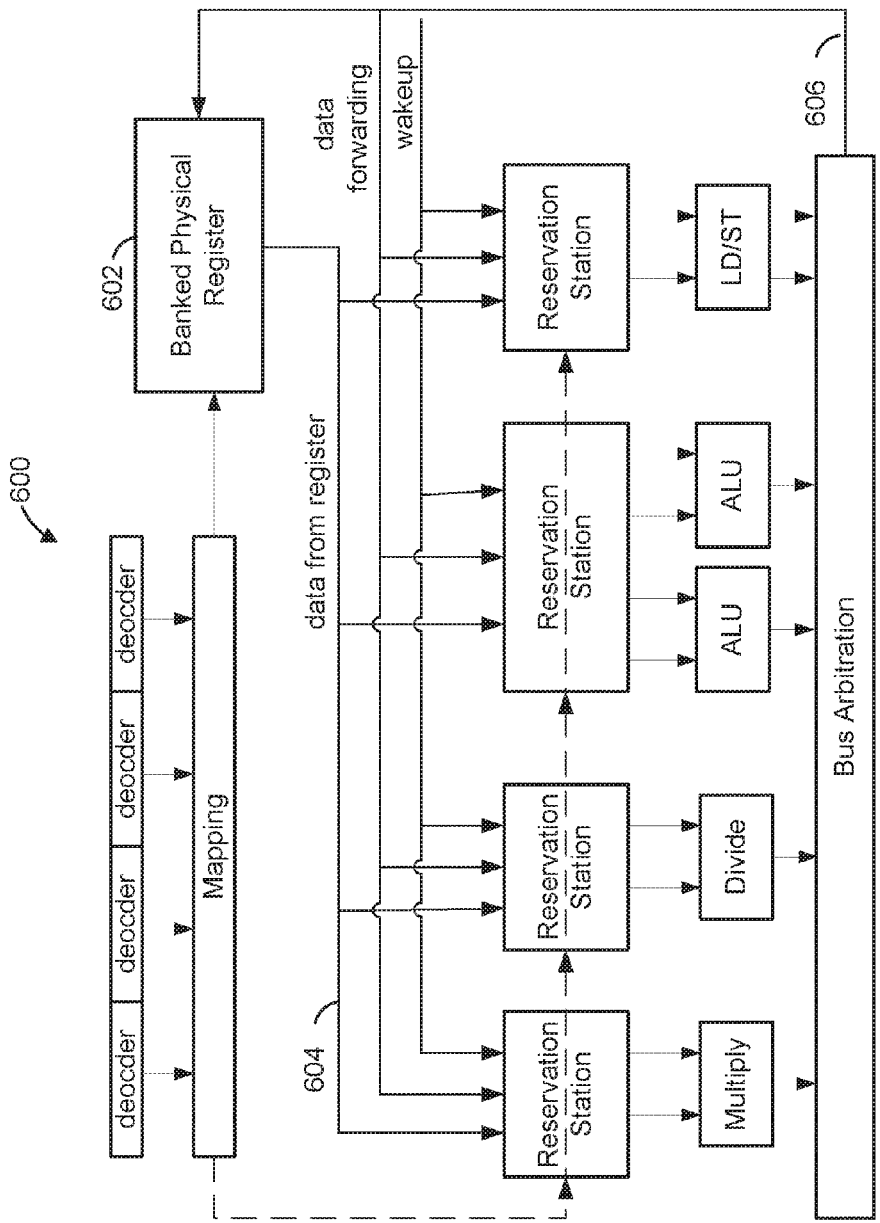
FIG. 6 is a block diagram of a processing system configured to simultaneously execute four instructions, according to an embodiment.

FIG. 6 is a block diagram of a processing system 600 configured to simultaneously execute four instructions, according to an embodiment. The system 600 is a version of the processing system 500 scaled to four-instruction issue width, according to an embodiment. The processing system 600 includes a banked register file 602. Data corresponding to four instructions simultaneously issued in the system 600 is read in parallel from respective register banks in the banked register file 602 via a data bus 604, in at least some embodiments and scenarios. Similarly, data resulting from simultaneous execution of four instructions in the processing system 600 is written in parallel to respective register banks of the register file 602 via a results bus 606, in at least some embodiments and scenarios.

Comparing the two-instruction issue width system 500 of FIG. 5 and the four-instruction issue width system 600 of FIG. 6, the banked register file 602 is relatively the same size as the banked register file 502, in at least some embodiments. Also, the data bus 504 is relatively the same as the data bus 604, in at least some embodiments. Similarly, the results bus 504 is relatively the same as the results bus 604, in at least some embodiments. Accordingly, the two-instruction issue width system 500 of FIG. 5 is scaled to the four-instruction issue width system 600 of FIG. 6 without significantly increasing the size of the processing system 500 and without significantly increasing the power dissipation of the processing system 500, in at least some embodiments.

Figure 7:
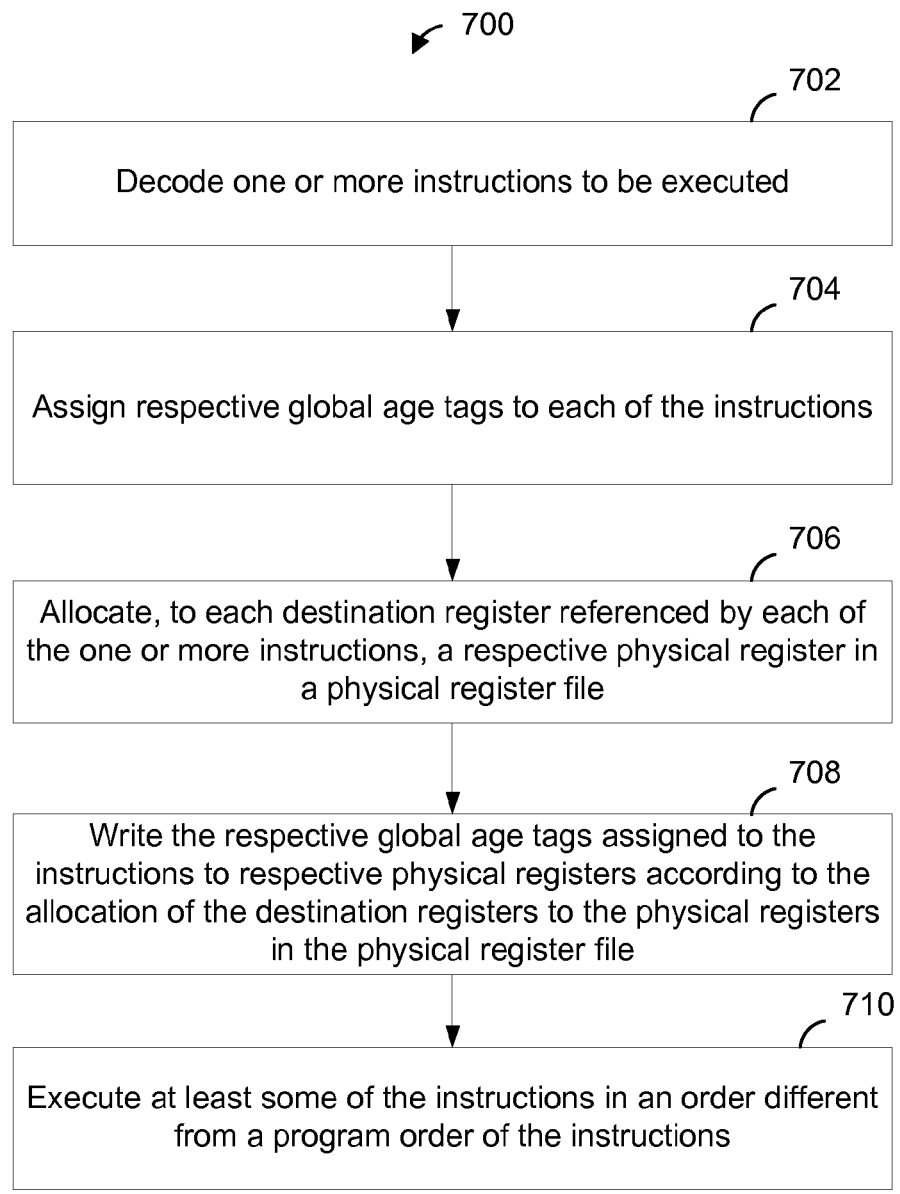
FIG. 7 is a flow diagram of an example method of executing instructions in a processing system, according to an embodiment.

FIG. 7 is a flow diagram of an example method 700 of executing instructions in a processing system, according to an embodiment. The method 700 is implemented by the processing system 100 of FIG. 1, in an embodiment. The method 700 is implemented by the processing system 200 of FIG. 1, in another embodiment. The method 700 is implemented by one of the processing system 500 of FIG. 5 or the processing system 600 of FIG. 6 in yet another embodiment. The method 700 is implemented by other suitable processing systems, in other embodiments. Similarly, the processing system 100, 200, 500 and/or 600 implement suitable methods for executing instructions other than the method 700, in other embodiments.

At block 702, one or more instructions to be executed by the processing system are decoded. The block 702 includes decoding one or several instructions in a single clock cycle, in various embodiments. For example, in one embodiments, in a single issue width processing system, a single instruction is decoded at block 702 during a single clock cycle. In another embodiment, such as in a multi-instruction issue width processing system, multiple instructions are decoded at block 702 in a single clock cycle.

At block 704, respective global age tags are assigned to the instructions decoded at block 702. In an embodiment, the respective global age tags assigned at block 704 indicate respective ages of the instructions in the processing systems and, accordingly, indicate an order of the instructions in the program code being executed by the processing system.

At block 706, respective physical registers in a physical register file (e.g., a banked physical register file) are allocated to each destination register referenced by each of the one or more instructions. For example, in an embodiment in which the register file is a banked register file that includes a plurality of register banks corresponding to a plurality of logical registers defined by instruction set architecture supported by the processing system, respective physical registers in the register banks corresponding to the logical register are allocated to the respective destination registers referenced by the one or more instructions.

At block 708, the respective global age tags assigned to the respective instructions are written to the respective physical registers according to the allocation, at block 706, of the destination registers to the physical registers in the physical register file.

At block 710, the instructions are executed. In an embodiment, block 710 includes executing at least some of the instructions in an order different from the program order of the instructions.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of executing instructions in a processing system, the method comprising:
   fetching one or more instruction to be executed by the processing system;
   assigning respective global age tags to each of the one or more instructions, wherein each of the global age tags indicates an age of the corresponding instruction in the processing system;
   allocating, to destination logical registers referenced by the one or more instructions, respective physical registers in a physical register file;
   writing the respective global age tags assigned to the instructions to the respective physical registers allocated to the destination logical registers of the instructions;
   executing at least some of the instructions in an order different from a program order of the instructions; and
   after executing the instructions, updating corresponding physical registers with results of the instructions, wherein updating the corresponding physical registers includes replacing the global age tags in the corresponding physical registers with results of the instructions.

2. The method of claim 1, wherein the physical register file is partitioned into a plurality of register banks, wherein each register bank corresponds to a respective logical register of a set of logical registers defined by an instruction set architecture supported by the processing system.

3. The method of claim 2, wherein allocating respective physical registers to each destination logical register referenced by each instruction includes mapping instances of a particular logical register referenced by the instructions to a physical register in a physical register bank corresponding to the logical register.

4. The method of claim 3, wherein each of at least some of the register banks comprises an ordered queue of registers.

5. The method of claim 4, wherein mapping a logical register to a physical register in the physical register bank comprises mapping the logical register to a next register in the queue in the register bank corresponding to the logical register.

6. The method of claim 4, further comprising:
   buffering the instructions and the global age tags assigned to the instructions in an in-flight instruction buffer;
   providing indications that instructions have been completed to the in-flight instruction buffer; and
   simultaneously retiring a set of instructions when all instructions in the set of instructions have been completed, wherein simultaneously retiring the set of instructions includes moving respective indications of heads of one or more queues in the register file to respective memory locations immediately following a respective youngest instruction of the set of instructions being retired in each one of the one or more queues.

7. The method of claim 4, further comprising:
   predicting a branch in a program code;
   fetching a set of instructions corresponding to the predicted branch in the program code;
   mapping destination logical registers of each of the one or more instructions to physical registers in the register banks corresponding to the destination logical registers;
   subsequently determining that the branch has been mispredicted; and
   in response to determining that the branch has been mispredicted, de-allocating the mapped physical register, wherein de-allocating the mapped physical registers includes moving respective indications of tails of one or more queues in the register file to respective memory locations immediately preceding a respective oldest instruction in the mispredicted branch.

8. The method of claim 1, further comprising selecting, from a set of instructions available for execution, an instruction to be executed next, wherein selecting the instruction comprises selecting an instruction having an oldest global age tag in the set of available instructions.

9. The method of claim 3, wherein an instruction comprises a load multiple instruction that specifies a set of multiple registers to be loaded with data from consecutive locations in a memory, and wherein executing the instruction comprises writing to the specified multiple registers by writing the data in parallel to respective physical banks corresponding to the logical registers.

10. The method of claim 3, wherein an instruction comprises a store multiple instruction that specifies a set of multiple registers from which to move data to consecutive locations in a memory, and wherein executing the instruction includes reading from the specified multiple registers by reading the data in parallel from respective physical banks corresponding to the logical registers.

11. A processing system, comprising:
   a plurality of reservations stations, each reservation station coupled to one or more functional units configured to execute instructions;
   one or more decoders configured to simultaneously decode one or more instructions, fetched from a memory, the one or more instructions corresponding to instructions of a program code;
   a mapping unit configured to
      assign respective global age tags to the one or more instructions, wherein each of the global age tags indicates an age of the corresponding instruction in the processing system,
      allocate, to destination logical registers referenced by the one or more instruction, respective physical registers in a physical register file, and
      write the respective global age tags assigned to the instructions in respective physical registers allocated to the destination logical registers of the instructions; and
   a write back unit configured to, after the instructions are executed by the functional units, update corresponding physical registers with results of the instructions, wherein updating the corresponding physical registers includes replacing the global age tags in the corresponding physical registers with results of the instructions;
   wherein the reservation stations are configured to send at least some of the instructions to the functional units coupled to the reservation stations in an order different from a program order of the instructions.

12. The processing system of claim 11, wherein the physical register file is partitioned into a plurality of register banks, wherein each register bank corresponds to a respective logical register of a set of logical registers defined by an instruction set architecture supported by the processing system.

13. The processing system of claim 12, wherein the mapping unit is configured to map instances of a particular logical register referenced by the instructions to a physical register in a physical register bank corresponding to the logical register.

14. The processing system of claim 13, wherein each of at least some of the register banks comprises an ordered queue of registers.

15. The processing system of claim 13, wherein the mapping unit is configured to map a logical register to a next register in the queue in the register bank corresponding to the logical register.

16. The processing system of claim 14, further comprising an in-flight instruction buffer configured to:
buffer the instructions and the global age tags assigned to the instructions;
maintain a state of completion of each of the buffered instructions; and
simultaneously retire a set of instructions when all instructions in the set of instructions have been completed,
wherein the mapping unit is configured de-allocate physical registers corresponding to the retired instructions at least by simultaneously moving respective indications of heads of one or more queues in the register file to respective registers immediately following a register corresponding to a respective youngest instruction of the set of instructions being retired in each one of the one or more queues.

17. The processing system of claim 14, further comprising a branch prediction unit configured to predicting a branch in a program code and to subsequently determine that the predicted branch was mispredicted; wherein
the mapping unit is configured to:
map destination logical registers of each of the one or more instructions to physical registers in the register banks corresponding to the destination logical registers; and
subsequent to the determination that the branch was mispredicted, de-allocate the mapped physical registers at least by moving respective indications of tails of one or more queues in the register file to respective memory locations immediately preceding a respective oldest instruction in the mispredicted branch.

18. The processing system of claim 11, wherein the reservation stations are configured to select, from a set of instructions available for execution, instructions to be executed next by the functional units coupled to the reservation stations at least by selecting an instruction having an oldest global age tag in the set of available instructions.

19. The processing system of claim 13, wherein an instruction comprises a load multiple instruction that specifies a set of multiple registers to be loaded with data from consecutive locations in a memory, and wherein executing the instruction comprises writing to the specified multiple registers by writing the data in parallel to respective physical banks corresponding to the logical registers.

20. The processing system of claim 13, wherein an instruction comprises a store multiple instruction that specifies a set of multiple registers from which to move data to consecutive locations in a memory, and wherein executing the instruction includes reading from the specified multiple registers by reading the data in parallel from respective physical banks corresponding to the logical registers.

* * * * *